April 2, 1968
H. R. BECK
3,375,552
APPARATUS FOR FORMING PLASTIC UNITS
Filed Dec. 6, 1965
2 Sheets-Sheet 1
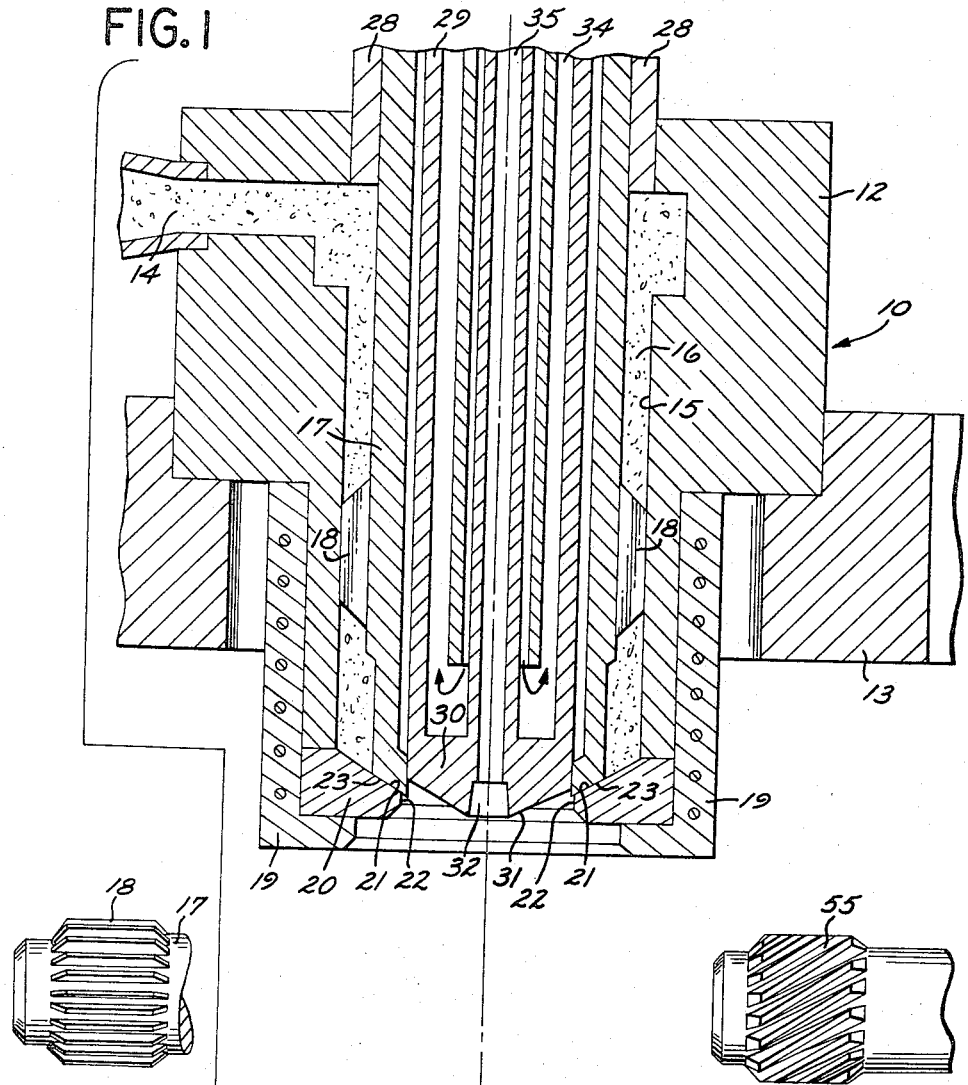
FIG. 1
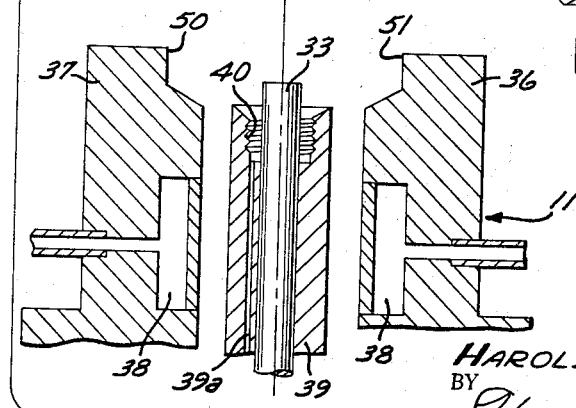
FIG. 7
FIG. 8
INVENTOR.
HAROLD R. BECK
BY
Harold R. Beck April 2, 1968 H. R. BECK 3,375,552
APPARATUS FOR FORMING PLASTIC UNITS
Filed Dec. 6, 1965 2 Sheets-Sheet 2
FIG. 2
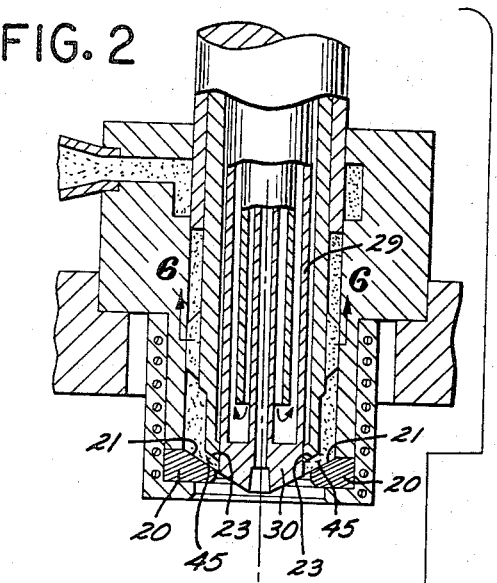
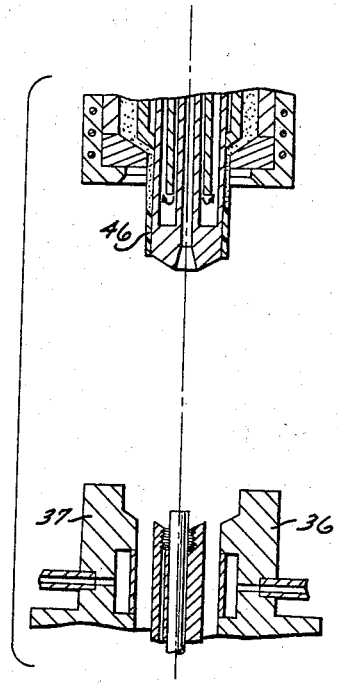
FIG. 3
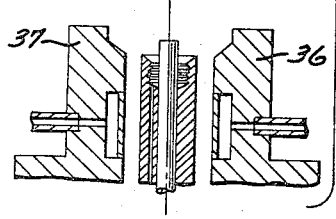
FIG. 6
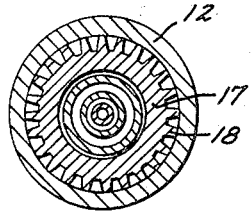
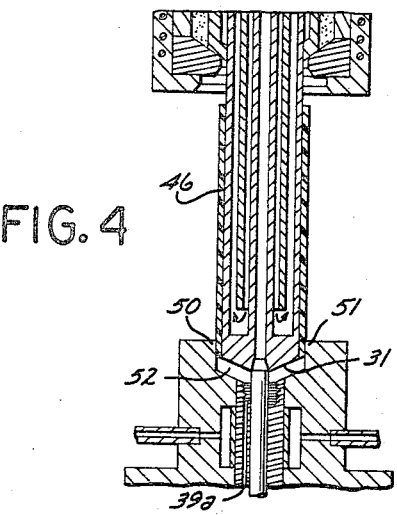
FIG. 4
FIG. 5
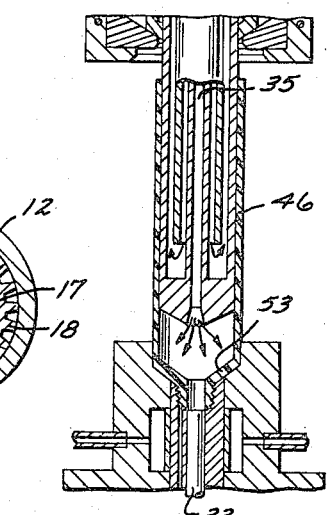
INVENTOR.
HAROLD R. BECK
BY
*Harold R. Beck*

United States Patent Office 3,375,552
Patented Apr. 2, 1968

3,375,552
APPARATUS FOR FORMING PLASTIC UNITS
Harold R. Beck, Woodland Hills, Calif., assignor to Rexall Drug and Chemical Company, Los Angeles, Calif., a corporation of Delaware
Filed Dec. 6, 1965, Ser. No. 511,718
3 Claims. (Cl. 18—30)

ABSTRACT OF THE DISCLOSURE

An apparatus for fabricating plastic containers wherein a movable mandrel is coated with plastic material and one end of the mandrel is received within dies which define a molding cavity between the mandrel and the dies, and flowable plastic material is introduced into the cavity to form a container end portion.

---

It is known to produce plastic containers by a combination of injection molding and extrusion processes as illustratively shown in U.S. Patent No. 3,109,198. One of the deficiencies in the process and apparatus shown in this U.S. patent is that the finished container can only be a single color since there is a single source for the heated plastic used to form the side and end wall. Thus, color differences in the side and end walls of the container only can be achieved in a subsequent decorating process which increases the cost and complexity of the formation of an aesthetically appealing container.

The present invention is directed to a technique for producing a container having the sidewall and end wall of different colors. This is achieved in part by a unique technique wherein different colored flowable plastic is supplied for the formation of the container at various times in the manufacturing cycle.

It is known to produce plastic containers of multiple colors by a two-step process wherein the side wall is formed in an extrusion process on a separate apparatus, the side wall is set and cooled and placed on a mandrel for the subsequent formation of the end wall by injection molding. The primary deficiency in this known process is that two separate molding steps are involved in the formation of a container in addition to the necessity of handling the container side wall between the molding steps. The present invention overcomes this difficulty in that a single piece of equipment forms the side wall and the end wall for the finished container and thus the process and apparatus is materially more economical from the initial investment standpoint and also from the subsequent operating and maintenance standpoint. Also, the side wall and end wall are formed on the same equipment without the necessity of handling the side wall between the molding steps.

The drawings illustrate the present preferred embodiment of the invention in which:

FIGURE 1 is a vertical cross-section made of the apparatus according to the present invention, and includes a plastic feeding means, means for kneading and distributing the plastic material, tubular elements which control a plastic extrusion die, and a stationary die which cooperates to form the end wall of the plastic article, all of said parts being in the relative position about to start a preliminary extrusion phase;

FIGURE 2 is a view similar to FIGURE 1 with the position of the parts changed to show the accomplishment of the first phase of the molding of the plastic material;

FIGURE 3 is a view similar to FIGURE 2 with the positions of the parts changed to show the second phase of the molding of the plastic material;

FIGURE 4 is a view similar to FIGURE 3 and showing the position of the parts changed to show the third stage of the molding of the plastic material and with the side walls of the plastic container clamped within the stationary die;

FIGURE 5 is a view similar to FIGURE 4 and showing the molding of the end wall of the plastic container and the start of the release of the container from the apparatus;

FIGURE 6 is a cross-section taken on line 6—6 of FIGURE 7 is a detailed side elevation view of a kneading head according to the present invention; and, FIGURE 8 is a view similar to FIGURE 7 illustrating a modification of the kneading head.

Briefly, the present invention is directed to the fabrication of plastic containers by depositing a coating of plastic material on the side wall of the elongated movable mandrel while moving the mandrel and coating away from the area of deposition (the plastic coating on the side wall of the mandrel forms the side wall of the container), terminating the coating on the mandrel, enclosing the outer end of the mandrel and the immediately adajacent portion of the coating on the mandrel within a die cavity to form the end portion of the container with the end portion fused to the coating on the side wall of the mandrel. Thus, the formation of the side walls and the end wall of the container is a continuous operation in contrast to the known two-state procedure wherein the container side wall is formed by a continuous extrusion process, the extrusion is cut into desired lengths and the end wall is formed by a separate injection molding operation.

An important facet of the present invention is that the plastic material or composition is violently agitated just prior to its deposition as a coating on the mandrel. This insures that the plastic material is maintained in a homogeneous condition and the plastic molecules in the coating are preferably randomly oriented throughout the coating resulting in an increased tear strength in the coating (and the container side wall). In the ideal situation, the coating is deposited on the mandrel in a helical configuration or grain to increase the strength (both flexure and tear) in the coating (and the container side wall).

The container fabricated according to the present invention has a side wall portion and an end wall portion which are integrally fused together to form a one-piece container. Preferably, the side wall portion of the container is predominently formed from randomly arranged molecules of the plastic material. Ideally, the configuration or grain of the side wall is in a pattern extending helically along the longitudinal axis of the side wall.

The specific apparatus according to the present invention is designed to perform as hereinbefore described and includes a plastic molding unit and a spaced die assembly. After deposition of the plastic coating on a movable mandrel, the outer end of the mandrel and coating are positioned within the die assembly and flowable plastic material is introduced into the die assembly to form the end wall of the finished container. Since the sources of the plastic material for the side wall and the end wall are different, the colors used for forming these walls can be different. The apparatus includes a mixing means which violently agitates the plastic material just prior to flowing the plastic material out of the die outlet to form the coating on the mandrel. In the ideal form of the invention, the agitating means moves the plastic material out of the die outlet in a helical configuration such that when the plastic material is set on the cooled mandrel the side wall of the container has a helical grain thereby increasing the flexure and tearing strength of the container side wall. By operating the agitating means at very high speed, the plastic material is deposited on the mandrel with the plastic molecules randomly arranged.

Referring specifically to the drawings, especially FIGURE 1, the invention includes a relatively fixed extrusion assembly 10 and a relatively fixed die-head assembly 11. A housing 12 is fixed to a stationary frame 13 and has a port 14 for introducing granular or fluid plastic material, such as polyethylene, polypropylene, polyvinyl chloride, nylon, from a conventional extruder or hopper (not shown). The port 14 may be connected to a conventional hopper system for feeding granular plastic material through the port 14 internally of the housing 12. The housing 12 has a central bore 15 which provides the chamber 15 in which the plastic material is homogenized and fluidized by a rotating kneading head 17 having a plurality of vanes 18 extending radially thereof. Heating units 19 are provided on the outer face of the housing in a conventional manner. A die plate 20 is provided on the lower end of the housing 12 and is fixed to the housing in a conventional manner by bolts, clamps, etc. The inner face of the die plate 20 is conically shaped at 21 and has a central opening 22 therein defining the extrusion opening.

The kneading head 17 is a hollow tubular member movable (by power means not shown) axially and rotatably within the bore 15 of the housing 12. The lower most end of kneading head 17 has a conical face 23 complementary to the face 21 of the die plate 20. The kneading head 17 is rotatably driven about its axis of rotation and is axially vertically as viewed in FIGURE 1. The vanes 18 on the kneading head 17, when driven in a rotational manner, homogenize the heated plastic granules or the flowable plastic material until it is in a flowable and of uniform consistency and composition.

A hollow tubular feed sleeve 28 is slidably mounted on the outside of kneading head 17 and is movable (by power means not shown) axially of the kneading head 17 and housing 12. The feed sleeve moves downwardly (to the position shown in FIGURE 2) to feed the homogenized plastic material in chamber 16 outwardly through the extrusion opening 22 to be described hereinafter.

A mandrel 29, cylindrical in form, is mounted for reciprocation (by power means not shown) inside the kneading head 17 and has a closed lower end 30 with a bottom wall 31 of a configuration desired on the inside face of the end wall of the finished container. The bottom wall 30 of the mandrel has a central opening 32 which receives a pin 33 in a manner to be described hereinafter.

The center portion of the mandrel 29 has a cooling fluid chamber 34 through which a cooling fluid flows. The cooling fluid cools and sets the plastic deposited on the outer face of the mandrel in a manner to be described hereinafter. For certain plastic materials it is desirable to circulate a heating fluid within the mandrel 29. A central passageway 35 is provided in the center of the mandrel and the passageway is connected with a source of pressurized air for the purpose of stripping the finished article from the mandrel in a subsequent stop to be described.

The die assembly 11 includes a pair of spaced movable die segments 36 and 37 normally biased apart to a position shown in FIG. 1 but movable inwardly by pneumatic or hydraulic piston and cylinder systems to a ninward position as show nin FIGURES 4 and 5. The segments are cooled by a liquid cooling medium in chamber 38 connected to a source cooling liquid (not shown). The die segments 36 and 37, when closed, form a continuous die cavity defining the outer face of the container end wall. A center die segment 39 has an injection molding passageway 39a therethrough. The passageway 39a is connected to a conventional injection molding machine which supplies fluidized plastic materials and compositions through the passageway 39a into the die cavity. The upper end of the die segment 39 has a tapped die opening 40 which defines a threaded neck on the container if desired. Of course, other configurations of the dies 36, 37, 39 and 40 can be provided to form various configurations for the end wall of the container. A central pin 33 is slidably mounted (reciprocal by power means not shown) within the die element 39, extends upwardly through die opening 40 and its upper end is received in the opening 32 in the mandrel 29. The pin 33 forms a dispensing opening in the end wall of the container.

The position of the various elements and parts are shown in FIGURE 1 at the start of a forming cycle. The cycle is commenced by the movement downward of the feed sleeve 28 thereby exerting the pressure on the fluidized plastic compoistion in the chamber 16 and the simultaneous upward movement of head 17. The sleeve 28 moves downwardly to and beyond the position shown in FIGURE 2 thereby cutting off the source of supply of plastic material through port 14. The kneading head 17 has been rotating during the plasticizing portion of the cycle to homogenize and fluidize the plastic material in the chamber 16. The rotation of the kneading head 17 is continued during the subsequent steps to be described herein, however, the rotation of the kneading head can be stopped at any desired point if it is not desired to form a container having a helically extending grain or flow pattern in the side wall of the container. As shown in FIGURE 2 the kneading head 17 is withdrawn upwardly thereby spacing the surface 23 of the kneading head from the surface 21 of the die plate 20 to provide an opening 45 therebetween. Thus, the fluidized plastic material in chamber 16 can flow downwardly and out of the continuous circular die opening 22 and into contact with the lower end of mandrel 29. Just prior to the point in the cycle, the mandrel 29 commences a downward movement as shown in FIGURES 2 and 3 and plastic material is deposited on the surface of the mandrel to form a side wall 46 of the container. The thickness of the side wall 46 is determined partly by the pressure exerted by the feed sleeve 28 and partly by the dimension of the opening defined between the surface 22 of the die plate 20 and the outer surface of the mandrel 29. Thus, the opening 22 can be increased in size or the mandrel surface can be decreased in size to increase the thickness of the wall 46 or the feed sleeve 28 can be moved downwardly at an increased rate thereby flowing additional plastic material through the passage 45 onto the mandrel. If the kneading head 17 and associated vanes 18 are rotating during this extrusion process the plastic material is flowed out the feed gate 45 at an angle oblique to the direction of movement of the mandrel 29 thereby providing a helical grain or flow pattern in the sidewall 46 of the article. It may be appreciated that the vanes 18 distribute the molecules in the plastic composition in this way by creating a flow pattern in the plastic material. High speed rotation of vanes 18 minimize an orientation of the plastic molecules and tends to randomly arrange the molecules thereby increasing the overall strength (uniform flexure and tear) of the side wall 46 of the container. The cooling fluid 34 is continuously circulated in the mandrel 29 to insure that the plastic material is cooled and set substantially immediately after leaving the die opening defined by the surface 22.

The mandrel 22 and its coating 46 continue the downward movement until the length of the side wall is at the desired length. At this point the kneading head 17 is moved downwardly to the position shown in FIGURE 4 thereby bringing the surface 23 into contact with the die plate surface 21 and terminating the flow of plastic material around the mandrel. This movement will determine the length of the side wall 46 as shown in FIGURE 4.

When the mandrel 29 and the surface 46 have reached this lowermost point the upper end of pin 33 enters the opening 32 in the mandrel thereby accurately positioning the mandrel and the coating 46 with respect to the die unit 11. The downward movement of the mandrel 29 is stopped at this point and the die segments 36 and 37 are moved inwardly. The inner circular surfaces 50 and 51 of the die segments 17 and 36, respectively, tightly clamp the lower end of the coating 46 within the segments and the lower face 31 of the mandrel stops in spaced relationship to the top wall of the die segments thereby defining a mold cavity 52 therebetween as shown in FIGURE 4. Fluidized plastic material is then introduced through the passageway 39 into the cavity 52 to injection mold an end wall on the container. The fluidized plastic material is sufficient in volume and temperature to fuse the lower end of the coating 46 thereby forming an end wall 53 (see FIGURE 5) integral with the side wall 46 of the finished container. The injection molded end wall of the container is permitted to cool, the pin 33 is retracted downwardly to the position shown in FIGURE 5 and pressurized air is introduced through the passageway 35 while the mandrel 29 is moved upwardly to strip the container from the mandrel. Retraction of the mandrel to its starting position shown in FIGURE 1 results in stripping the article from the mandrel. The die segments 36 and 37 are then moved outwardly and the container is unthreaded from the portion 40 of the die to release the container therefrom.

FIGURES 6 through 8 illustrate the kneading head. The vanes 18 on the kneading head may be in parallel spaced relationship as shown in FIGURE 7 or may be formed in a helical manner as shown in 55 of FIGURE 8.

While a present preferred embodiment of the invention has been described, it may be otherwise embodied within the scope of the following claims.

I claim:
1. In an apparatus for fabricating plastic containers, including:
 (a) an outer housing having an outlet at one end thereof and an inlet for introducing plastic materials into the housing;
 (b) a mandrel within the housing to form a chamber between the housing and mandrel;
 (c) power means to move the mandrel axially through the chamber and outlet;
 (d) second power means to flow plastic material from the chamber out of the outlet during said axial movement of the mandrel to deposit the plastic material in a thin layer on the mandrel to form the container side walls;
 (e) die means spaced from said outlet to receive the outermost end of said mandrel and outermost portions of said container side walls, said die means forming a cavity in communication with said outermost portions of the container side walls; and,
 (f) plastic feed means to introduce flowable plastic into said cavity to form a container end portion and fuse the same to said outermost portions of the container side walls.
2. In an apparatus according to claim 1, including:
 (a) mixing means operable within said chamber to violently agitate said plastic materials just prior to flowing the materials out said outlet.
3. In an apparatus according to claim 2, including:
 (a) means to drive said mixing means to flow said plastic materials out said outlet in a helical path to form said container side walls.

References Cited
UNITED STATES PATENTS

| | | | |
|---|---|---|---|
| 2,777,164 | 1/1957 | Strahm | 18—30 |
| 2,778,533 | 1/1957 | Savary | 18—5 |
| 2,923,975 | 2/1960 | Voumard et al. | 18—30 |
| 2,994,107 | 8/1961 | Quinche | 18—30 |
| 3,109,198 | 11/1963 | Guignard | 18—14 |
| 3,115,682 | 12/1963 | Soubier et al. | 18—30 |

WILBUR L. McBAY, *Primary Examiner.*